Patented July 26, 1932

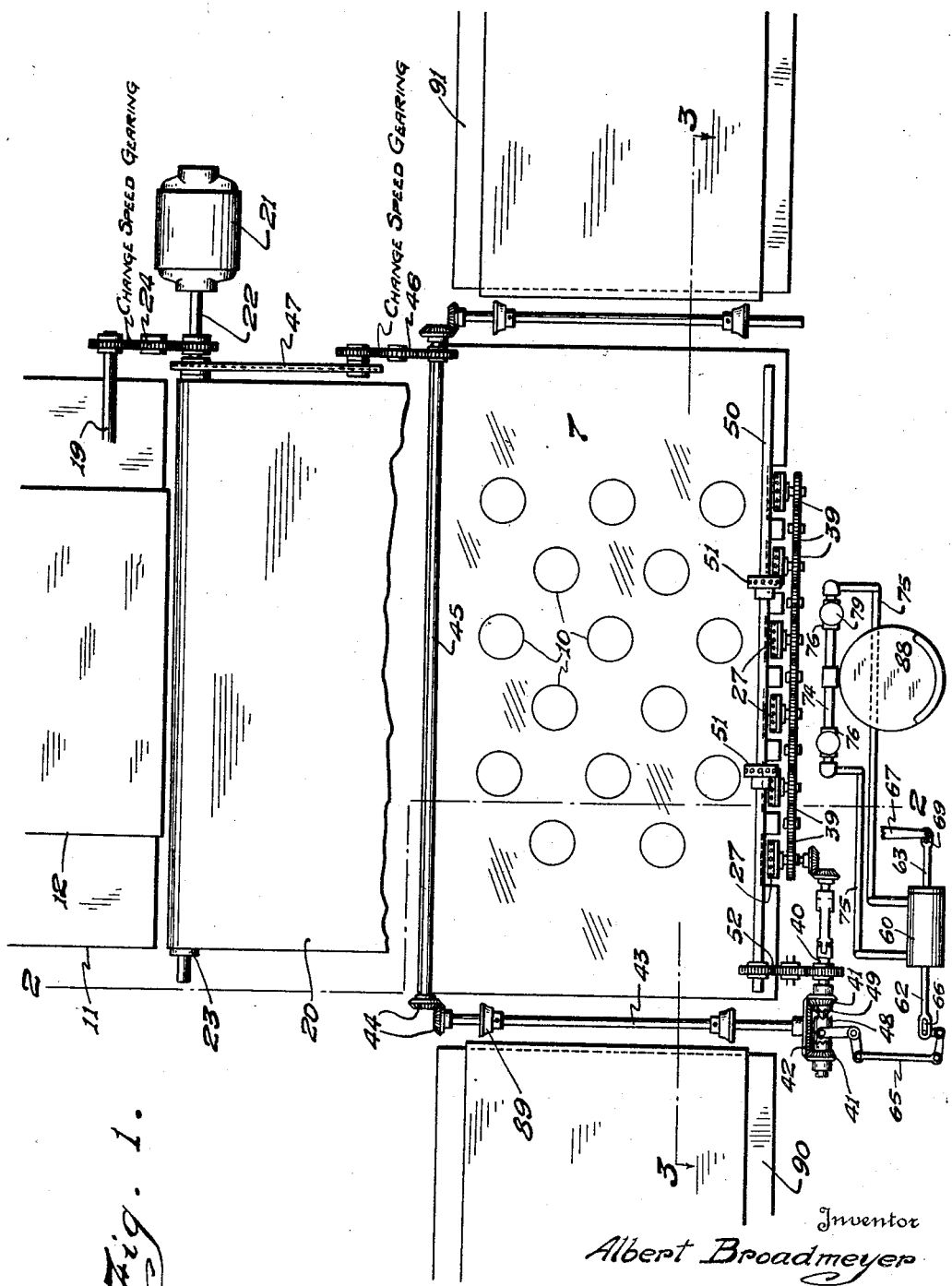

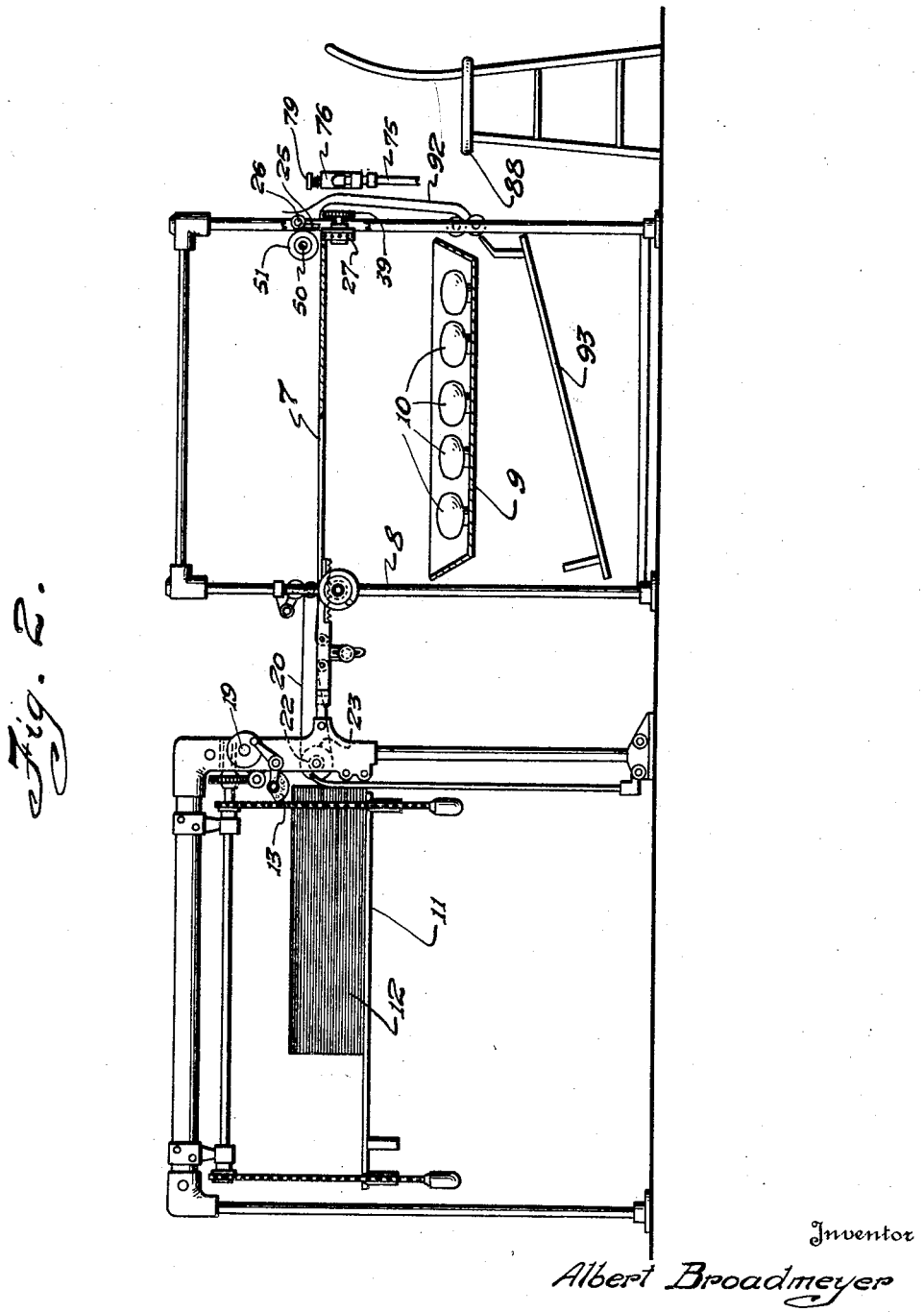

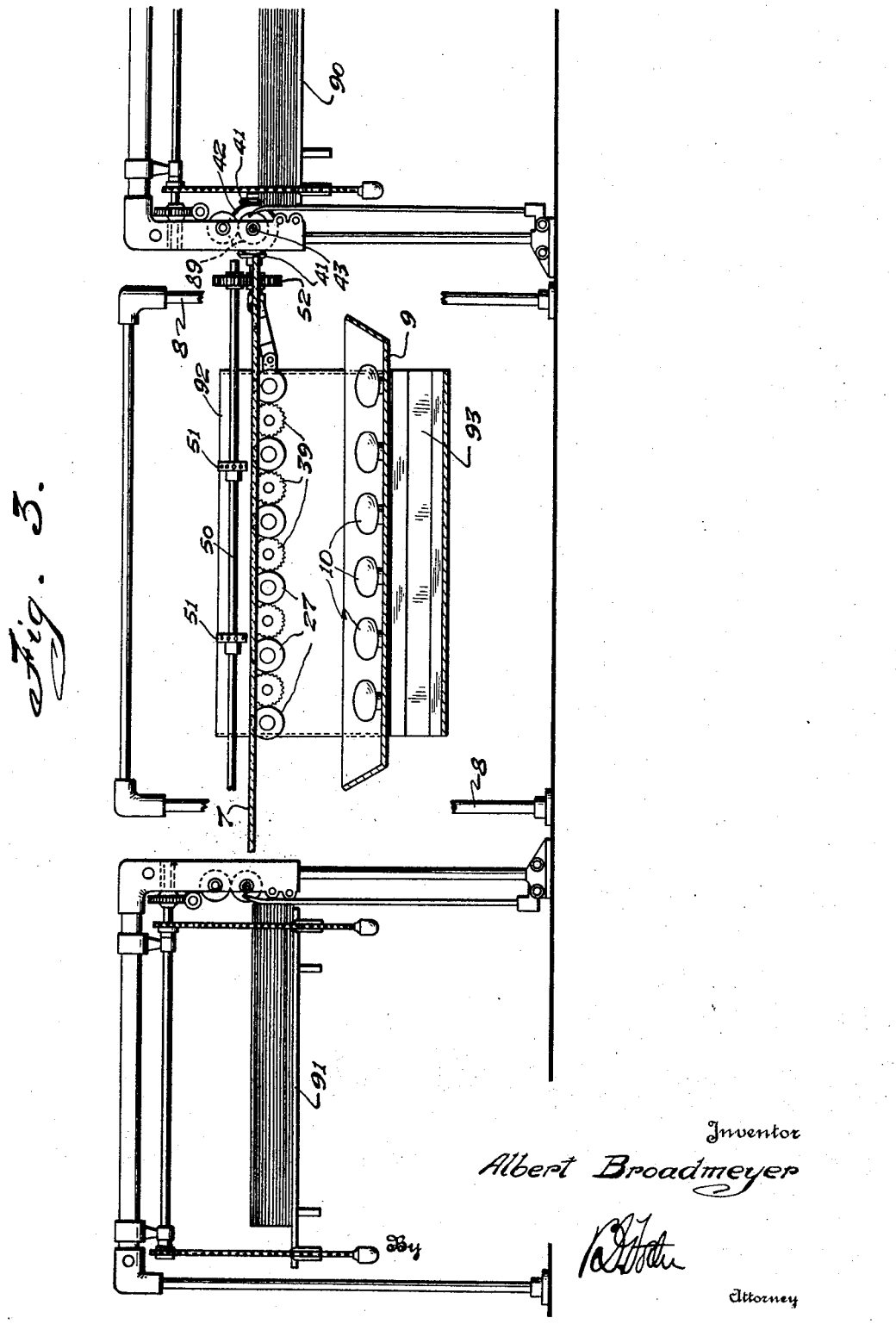

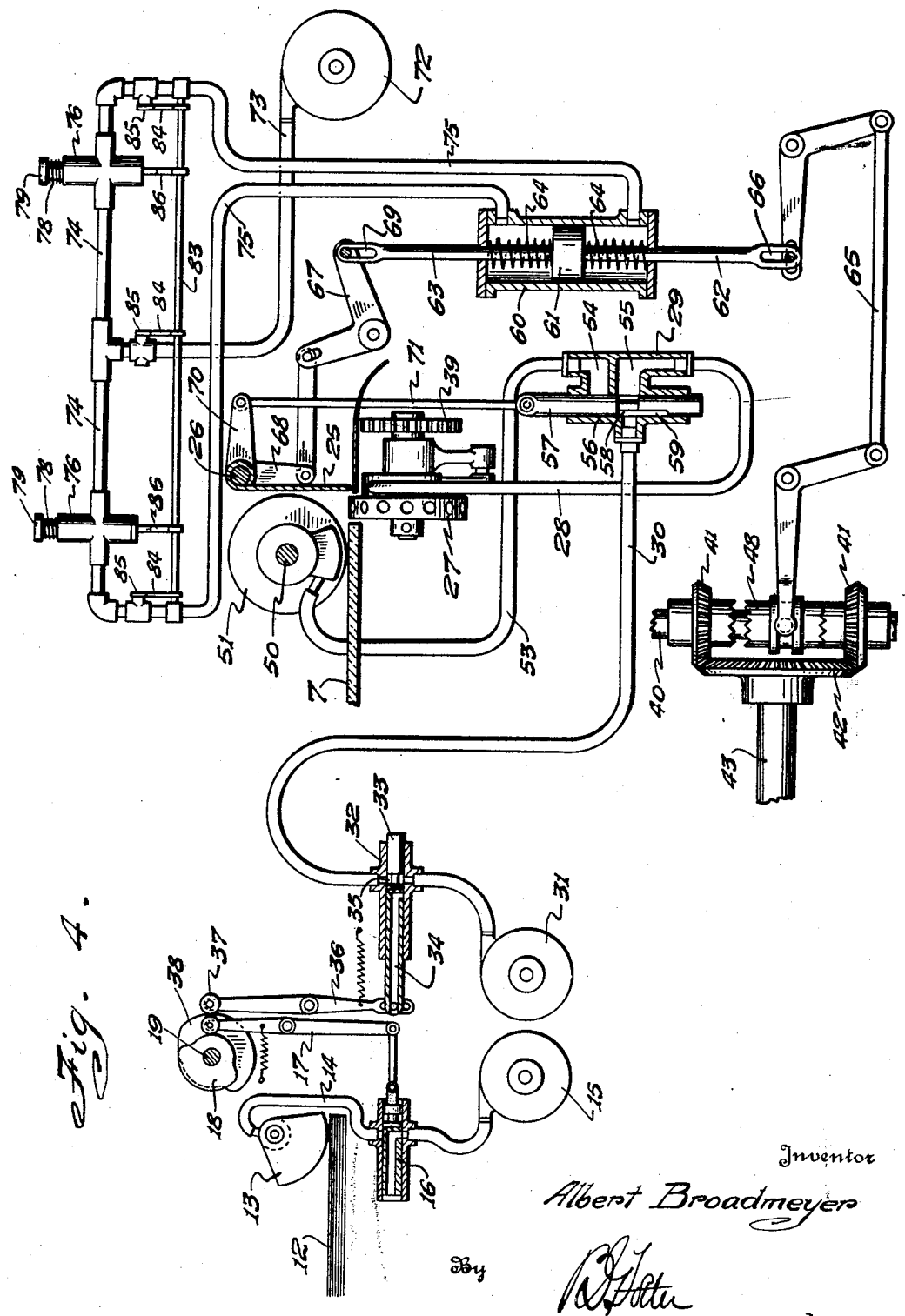

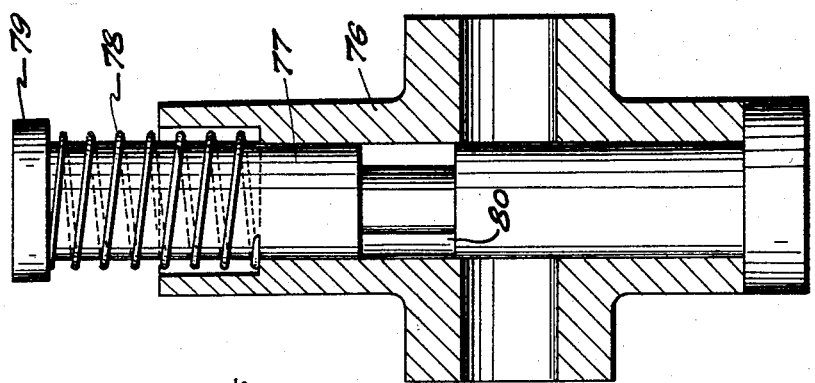
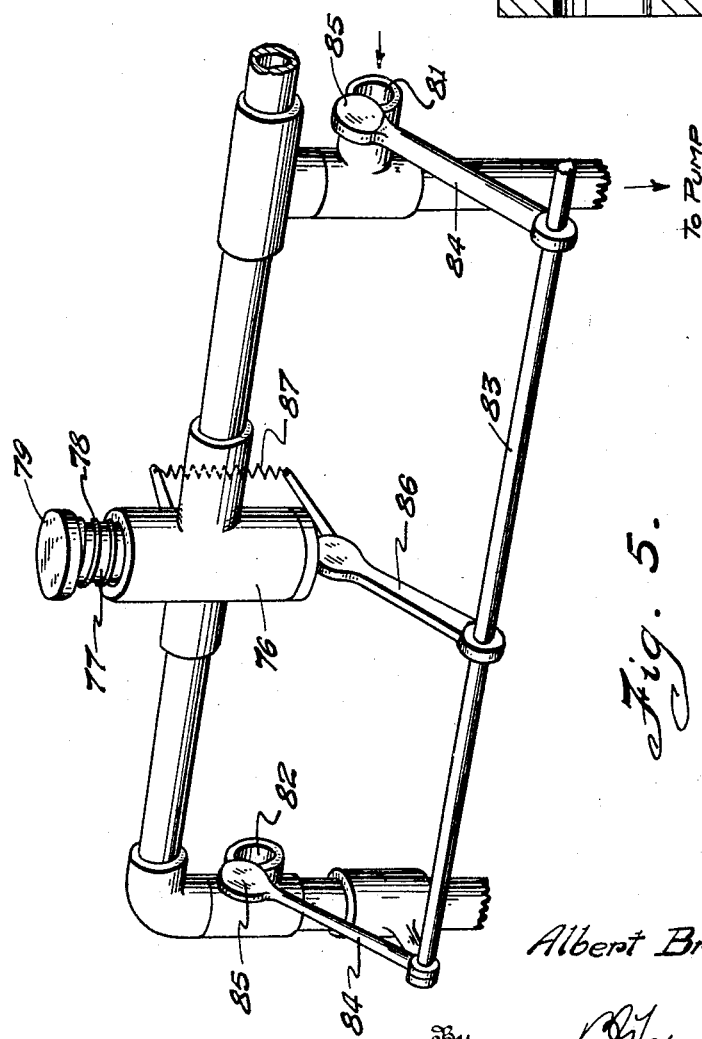

1,869,300

UNITED STATES PATENT OFFICE

ALBERT BROADMEYER, OF HARRISBURG, PENNSYLVANIA, ASSIGNOR TO W. O. HICKOK MANUFACTURING COMPANY, OF HARRISBURG, PENNSYLVANIA, A CORPORATION OF PENNSYLVANIA

SHEET INSPECTING APPARATUS

Application filed February 11, 1929. Serial No. 339,102.

In a patent secured by me No. 1,685,761, under date of September 25, 1928, there is disclosed and claimed an apparatus for inspecting sheets of paper and the like. The object of the present invention is to provide an apparatus for the same general purpose, but one that is much more compact in its character, is all together within the convenient range of vision of the operator and involves novel mechanism of a simple and effective character for selectively disposing of the sheets inspected.

In the accompanying drawings:

Figure 1 is a plan view of the preferred embodiment of the invention, the frame of the machine not being shown in order to avoid confusion, and so that the active mechanism may be better illustrated.

Figure 2 is a view partly in side elevation and partly in section of the same and taken substantially on the line 2—2 of Figure 1.

Figure 3 is a cross sectional view of the line 3—3 of Figure 1.

Figure 4 is a diagrammatic view in order to show the various driving and controlling mechanisms in assembled relation.

Figure 5 is a detail perspective view of a portion of the manually operated controlling mechanism.

Figure 6 is a sectional view through one of the manually operated controlling valves.

In the embodiment disclosed a transparent supporting sheet or table 7 is provided that is preferably of glass, and is carried in a suitable supporting frame 8. Beneath the sheet or supporting table 7 is a tray 9 carrying suitable illuminating means, such as electric lamps 10, whose rays of light are thus thrown upwardly through the table 7.

In rear of this structure is a sheet feeder 11 that may be of any suitable character, but is preferably a "pile feeder", that is to say, the sheets are delivered from the top of a pile 12. The means for feeding these sheets and indeed the entire structure of the feeder is well known and it is thought need not be explained in detail. Preferably however it is of the character disclosed in my co-pending application, Serial No. 269,737. That feeder includes an oscillatory suction head 13 connected by a conduit 14 with the intake side of an air pump 15. In this conduit is a controlling valve 16 that is movable to a position to vent the pump 15 to atmosphere and to a position to cut off such vent and afford communication between the pump and the suction head 13. The suction head thus becomes intermittently operated to attach a sheet thereto and on its rotation in a rearward direction, to feed the sheet toward the sheet support 7. This intermittent action is obtained by means of a lever 17 connected to the valve 16 and operated by a cam 18 on a cam shaft 19.

The sheets as thus fed are delivered on to an endless belt or cloth 20 interposed between the feeder and the rear end of the inspecting table 7. For the purpose of driving this mechanism, a motor is shown at 21 (Figure 1) and is suitably geared to a drive shaft 22 carrying a roller 23, around which the endless belt or cloth passes. A change speed gearing 24 transmits motion from the shaft 22 to the feeder shaft 19.

It will thus be evident that with the structure as thus far described, sheets will be fed successively from the feeder on to the cloth 20 and will be delivered by said cloth on to the transparent inspecting table 7.

At the side opposite to that which receives the sheets from the feeder, there is mounted a gate 25 carried by a rock shaft 26 that is located above the inspecting table 7. The lower end of this gate is in the path of the sheets delivered by the feeder and conveyor, which thus constitutes a stop for said sheets. Between the lower end of the gate 25 and the adjacent end of the table 7 are located a plurality of suction rollers 27 that are mounted so that they rotate transversely to the direction of feed of the sheets. These suction rollers are connected by branch conduits 28 with a manifold 29 connected in turn to a conduit 30 leading to the intake side of a pump 31. In said conduit 30 is a valve casing 32 having a plunger valve 33 therein. This plunger valve is provided with a relief port 34 and with a passageway 35, either of which can be moved to afford communication with the conduit accordingly as the valve is reciprocated. The reciprocation is obtained by means of a rocker arm 36 connected to the valve and having a roller 37 riding a cam 38 on the cam shaft 19. With this construction therefore it will be evident that the pump 31 is alternately vented to atmosphere through the port 34 and is brought into communication with the manifold 29 and consequently with the suction rollers 27.

The suction rollers 27 as shown more particularly in Figure 1, are geared together as shown at 39, so that they are all rotated in the same direction and they are further geared to a driving shaft 40. On this shaft are loosely journaled oppositely beveled driving gears 41 in mesh with a common gear 42 on a counter-shaft 43. This counter-shaft is geared at 44 to a shaft 45. The shaft 45 is connected by change speed gearing 46 and a sprocket chain drive 47 with the driving shaft 22. Feathered on the shaft 40 is a reciprocable clutch sleeve 48, the two driving gears 41 having clutch teeth 49 with which the clutch sleeve 48 is adapted to mesh. It will thus be clear that the suction rollers 27 can be rotated in either of opposite directions by shifting the clutch sleeve 48. However, the said clutch sleeve is coupled to one of the driving gears so as to normally rotate the suction rollers in one direction.

Located over the rear portion of the inspection table 7 and extending longitudinally of the gate in advance of the same is a carrier shaft 50 carrying suction rollers 51 that are thus located at right angles to the suction rollers 27 and overlie the rear end of the table 7. The shaft 50 and consequently the suction roller 51 are geared, as shown at 52, to the shaft 40. Consequently said suction rollers 51 rotate continuously with the suction rollers 27. The suction rollers 51 are connected by conduit branches 53 with a chamber 54 formed in the upper part of the manifold 29, and separated from the lower chamber 55 with which the conduit branches 28 communicate. This manifold 29 includes in its make-up a valve chamber 56 in which is a reciprocatory plunger valve 57. The plunger valve has an annular groove 58 with an offset channel 59. Normally the valve 57 is in a position to afford communication between the conduit 30 and the lower chamber 55, as shown in Figure 4, so that the suction rollers 27 are connected to the conduit. As the valve is raised, however, the chamber 55 and consequently the suction rollers 27 are cut off from the conduit 30, while the chamber 54, which is normally cut off from the same, is brought into communication with said conduit 30 and consequently the branches 53 and the suction rollers 51 communicate with the conduit 30.

As a part of the controlling mechanism there is provided a fluid operated motor, preferably of the suction type. This motor consists of a cylinder 60, in which is a reciprocatory piston 61. The piston 61 has oppositely extending piston rods 62 and 63 projecting beyond the cylinder heads. Within the cylinder there are coiled springs 64 placed on the rod on opposite sides of the piston to cushion its end movements. One of the piston rods 62 has a crank and link connection 65 with the clutch sleeve 48. This connection includes a lost motion slot 66 formed in the end of the piston rod 62. The other piston rod 63 has a bell crank and link connection 67 with an arm 68 on the rock shaft 26 that carries the gate 25. This connection also includes a lost motion slot 69 in the piston rod 63. The rock shaft 26 furthermore has a crank arm 70 which is connected by a link 71 with the controlling valve 57.

A third suction pump is shown at 72, and connected to the intake side of the same is a suction conduit 73 leading to branches 74, preferably metal piping located at the rear side of the inspecting table 7. The branches 74 include conduit portions 75 leading to the cylinder 60 on opposite sides of the piston 61. In the branches 74 are controlling valve mechanisms. These comprise casings 76 (see Figure 6), and in said casings are reciprocatory plunger valves 77 normally held elevated by springs 78 and terminating at their upper ends in thumb pieces 79. The valves are provided with channels 80 that are normally out of communication with the passageways through the branches 74, so as to close said passageways, but upon the depression of a valve, the channel 80 is brought into register with the passageway to open communication between the same. In addition the conduit 73 is provided with a vent 81, and each branch 74 has a vent 82. A rock shaft 83 suitably supported on the branches is provided with arms 84 carrying closure plates 85 that are movable to and from positions over the vent 81—82. This rock shaft also has arms 86 that are held against the lower ends of the valves 77 by springs 87.

The operation of the mechanism is as follows: The feeder head 13, operating at predetermined intervals, moves the topmost sheets from the pile 12 on to the conveyor 20, and each sheet is thus delivered by said conveyor on to the inspection table 7. The operator at the rear of the machine, seated on a chair, as 88, looks over the sheet and because of the transmitted light, can readily note any defect either in the paper structure, or torn sheets. It will be understood that the sheet is brought up against the gate 25. If the sheet is found to be perfect or of a sufficiently high grade to pass as number 1, the operator ignores it. At the proper time the valve 33 moves to the position shown in Figure 4, the valve 57 being also in the position shown. When the valve 33 is thus moved, suction through the conduit 30 is transmitted through the branches 28 to the continuously rotating suction rollers 27. The suction created through these rollers thus causes the sheet to adhere thereto and they therefore move said sheet to the left as viewed in Figure 1, where it is caught by suitable delivering rollers 89 and transferred to a suitable receiver 90. It will be understood that the feed controlling valve 16 and the transfer-controlling valve 35 are operating in timed relation, so that a sheet is removed from the inspecting table in proper time to a sheet being fed on to the same. For this reason moreover the change speed gearing 24 and 46 is employed in order that the proper relative speed of the parts may be secured for sheets of different sizes and shapes.

This repeated passing of the sheets takes place as long as the operator notes perfect sheets. When, however, a sheet appears that is sufficiently defective to be classed as a "second", he has only to press upon the left hand controlling valve 77 that is located conveniently at hand. When this valve is depressed, the vents 81 and 82 are closed and the suction conduit 73 is brought into communication with the branch conduit 75.

The result is that suction is created in the upper portion of the cylinder 60 (as viewed in Figure 4). The piston 61 is consequently raised. This causes the clutch sleeve 48 to be shifted from the left hand drive gear 41 to the right hand drive gear and couples the latter to the shaft 40. The direction of rotation of the suction rollers 27 is reversed. Therefore instead of the sheet being delivered from the left-hand side of the inspection field or table 7, as viewed in Figure 1, it is delivered to a suitable receiver 91 at the right hand side of the same, it being noted that the valve 57 is unchanged and the valve 33 is operating in its ordinary sequence. The upward movement of the piston 61 moreover does not effect any movement of the linkage 67 because of the lost motion slot 69. As soon as the left hand valve 76 is released by the operator, the parts assume their normal relation and operation as first described.

Now if a decidedly defective sheet is delivered on to the inspection table 7, one that may be classed as wholly useless or below the grade of No. 2, the operator presses the right hand controlling valve 77. The suction conduit 73 is now connected to the branch 75 leading to the lower end of the cylinder 60 (as viewed in Figure 4) and consequently the piston 61 moves toward the lower end of the cylinder. This downward movement by reason of the slot 66, has no effect on the clutch sleeve 48, but the upper piston rod 63 now causes the link mechanism 67 to swing the rock shaft 26 and raise the gate 25 from the path of the defective sheet that is against it. This turning of the rock shaft 26 also elevates the valve 57, cutting off the chamber 55 from the conduit 30 and bringing the conduit 30 into communication with the chamber 54. As the controlling valve 33 opens therefore suction will now take place through the previously idle, though rotating suction rollers 51, while the suction rollers 27 are now idling. The sheet is therefore seized by the rollers 51 and passed rearwardly from the table 7 and beneath the elevated gate 25. It is suitably directed by a chute 92 to a receiver 93 located in the frame 8 below the illuminating tray and lamps 10.

It will be clear that this structure is very compact and that the control is simple. More than that, not only the field of inspection but the entire feeding and distributing mechanism is before the operator so that any failure, jamming or error on the part of the sheets to take their proper path and be properly disposed of will be immediately noticed and the machine stopped or adjusted as occasion may require.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In apparatus of the character set forth, the combination with an inspection field, of means for delivering sheets successively thereto, periodically operating suction means for moving the sheets from the inspection field, and means operable by an inspector viewing the sheets on the field for controlling said operation.

2. In apparatus of the character set forth, the combination with an inspection field, of a movable suction head for moving the sheets from the field, means for feeding sheets successively to said field and to a position to be acted on by the suction head, means for creating suction in the head when a sheet is associated therewith, and manual means operable by a person inspecting the sheets on the field for controlling the suction in the head.

3. In apparatus of the character set forth, the combination with an inspection field, of a movable suction head for moving the sheets from the field, means for feeding sheets successively to said field and to a position to be acted on by the suction head, means for maintaining the head substantially free from suction during the movement of a sheet into associated relation therewith and creating suction in the head when a sheet is associated therewith, and manual means operable by a person inspecting the sheets for controlling the operation of the suction head.

4. In apparatus of the character set forth, the combination with an inspection field, of means for feeding sheets thereto in one direction, means for temporarily holding them for inspection on the field, and mechanism operating in timed relation to the feeding means to permit the holding of the sheet and automatically operating thereafter for removing them in a direction transverse to the direction in which they were fed to the field.

5. In apparatus of the character set forth, the combination with an inspection field, of means for feeding sheets thereto in one direction, means for temporarily holding them for inspection on the field, and mechanism operating in timed relation to the feeding means to permit the holding of the sheet and automatically operating thereafter for selectively removing the sheets in different directions and transversely to the direction in which they were fed to the inspection field.

6. In apparatus of the character set forth, the combination with an inspection field, of means for feeding sheets thereto in one direction, means for temporarily holding them for inspection on the field, mechanism operating in timed relation to the feeding means to permit the holding of the sheet and automatically operating thereafter for automatically removing the sheets successively from the field in a predetermined direction, and mechanism for selectively causing certain sheets to be removed in a direction transverse to the direction of delivery of the sheets to the inspection field.

7. In apparatus of the character set forth, the combination with an inspection field, of means for feeding sheets thereto in one direction, means for temporarily holding them for inspection on the field, mechanism operating in timed relation to the feeding means to permit the holding of the sheet and automatically operating thereafter for automatically removing the sheets successively from the field in a direction transverse to the direction of delivery of the sheets to the inspection field, and mechanism for preventing the said removal of the sheets and causing them to be removed in a different direction.

8. In apparatus of the character set forth, the combination with an inspection field, of means for feeding sheets thereto in one direction, means for temporarily holding them for inspection on the field, mechanism operating in timed relation to the feeding means to permit the holding of the sheet and automatically operating thereafter for automatically removing the sheets successively from the field in a direction transverse to the direction of delivery of the sheets to the inspection field, and mechanism for preventing the said removal of the sheets and causing them to be removed in an opposite direction.

9. In apparatus of the character set forth, the combination with an inspection field, of means for feeding sheets thereto in one direction, means for temporarily holding them for inspection on the field, mechanism operating in timed relation to the feeding means to permit the holding of the sheet and automatically operating thereafter for automatically removing the sheets successively from the field in a direction transverse to the direction of delivery of the sheets to the inspection field, and mechanism for preventing the said removal of the sheets and causing them to be removed in a direction initially lengthwise of the direction of their delivery to the inspection field.

10. In apparatus of the character set forth, the combination with an inspection field on which sheets are placed for inspection, of common means operating on the faces of the sheets for removing the sheets from the field in either of opposite directions, mechanism for causing said means to have an intermittent action to permit the placing of the sheets while the means are inactive, and manual means for causing said means to operate in either of opposite directions.

11. In apparatus of the character set forth, the combination with an inspection field on which sheets are placed for inspection, of reversibly rotatable rollers for removing the sheets from the field in either of opposite directions, automatic means for causing the rollers to become intermittently operable, and manually controlled mechanism for rotating the rollers in either of said opposite directions.

12. In apparatus of the character set forth, the combination with an inspection field on which sheets are placed for inspection, of reversibly rotatable suction rollers for removing the sheets from the field in either of opposite directions, manually controlled mechanism for rotating the rollers in either of said opposite directions, and means for periodically creating suction in said rollers irrespective of their direction of rotation.

13. In apparatus of the character set forth, the combination with a fixed sheet support, of means for delivering sheets successively to a predetermined position on the support, reversibly rotatable suction rollers having fixed relation with the support and into coaction with which the sheets are brought when delivered on said support, means for creating suction in the rollers when sheets are associated therewith, and means for causing the rollers to rotate in either of opposite directions.

14. In apparatus of the character set forth, the combination with a fixed support for sheets, of suction rollers that operate transversely thereof and have a fixed relation with respect thereto, means for intermittently creating suction through the rollers, mechanism for rotating the rollers in either of opposite directions, said means normally rotating the rollers in one direction, and manual means for controlling the mechanism to reverse the rotation of the rollers.

15. In apparatus of the character set forth, the combination with a support for sheets, of suction rollers that operate transversely thereof, means for intermittently creating suction through the rollers, mechanism for rotating the rollers in either of opposite directions, said means normally rotating the rollers in one direction, and air operated manually controlled means for controlling the mechanism to reverse the rotation of the rollers.

16. In apparatus of the character set forth, the combination with a support for sheets, of suction rollers that operate transversely thereof, means for intermittently creating suction through the rollers, mechanism for rotating the rollers in either of opposite directions, including oppositely rotating driving members, a clutch movable into coaction with either driving member, and an air actuated motor for shifting the clutch.

17. In apparatus of the character set forth, the combination with a support for sheets, of suction rollers that operate transversely thereof, means for intermittently creating suction through the rollers, mechanism for rotating the rollers in either of opposite directions, including oppositely rotating driving members, a clutch movable into coaction with either driving member, a pneumatic motor for shifting the clutch, and manual means for controlling the supply of air to the motor.

18. In apparatus of the character set forth, the combination with a support on which sheets are successively placed, of a gate for stopping the sheets, normally inactive means associated with the sheets when stopped by the gate for moving the sheets past the gate when the latter is moved to an inactive position, and means for moving the gate and causing the sheet moving means to become active in timed relation.

19. In apparatus of the character set forth, the combination with a support on which sheets are successively placed, of a gate for stopping the sheets, normally inactive means associated with the sheets when stopped by the gate for moving the sheets past the gate when the latter is moved to an inactive position, means for moving the gate and causing the sheet moving means to become active in timed relation, and controlling mechanism for said last mentioned means.

20. In apparatus of the character set forth, the combination with a support on which sheets are successively placed, of a gate for stopping the sheets, normally inactive means for moving the sheets past the gate when the latter is moved to an inactive position, means for moving the gate and causing the sheet moving means to become active in timed relation, and fluid actuated controlling mechanism for said last mentioned means.

21. In apparatus of the character set forth, the combination with a support on which sheets are successively placed, of a gate for stopping the sheets, a suction roller for moving the sheets past the gate when the latter is moved to an inactive position, and means for moving the gate and simultaneously causing suction through the roller.

22. In apparatus of the character set forth, the combination with a support on which sheets are successively placed, of a gate for stopping the sheets, a suction roller for moving the sheets past the gate when the latter is moved to an inactive position, a suction conduit connected to the roller, a valve in the conduit, and common means for moving the gate and the valve.

23. In apparatus of the character set forth, the combination with a support on which sheets are successively placed, of a gate for stopping the sheets, a suction roller for moving the sheets past the gate when the latter is moved to an inactive position, a suction conduit connected to the roller, a valve in the conduit, fluid operated means for moving the gate and valve, and manually operated mechanism for controlling the operation of the fluid operated means.

24. In apparatus of the character set forth, the combination with a support for the sheets, of a stop gate associated with the support, means for feeding sheets successively on to the support and against the stop, a suction roller in advance of the stop and in a position to operate on the sheets that are stopped thereby, and means for creating suction in the roller and moving the gate out of the path of the sheets to permit the roller to move the sheets past the gate.

25. In apparatus of the character set forth, the combination with a support for the sheets, of a stop gate overlapping the support and movable toward and from the same, means for feeding sheets successively on to the support and against the stop, a suction roller in advance of the stop over the support and in a position to operate on the sheets that are stopped thereby, a suction conduit connected to the roller, a controlling valve in the conduit, a vacuum motor having connections with the valve and gate to move both, a suction conduit connected to the motor, and a controlling valve in the last mentioned suction conduit.

26. In apparatus of the character set forth, the combination with a support for sheets, of suction rollers for moving the sheets from the support in different angularly disposed directions, and means for selectively controlling the creation of suction through the rollers.

27. In apparatus of the character set forth, the combination with a support for sheets, of suction rollers rotating on angularly disposed axes, means for constantly rotating the rollers, and mechanism for controlling the suction through the rollers to cause either to become active and the other inactive and vice versa.

28. In apparatus of the character set forth, the combination with a support for sheets, of suction rollers rotating on angularly disposed axes, means for constantly rotating the rollers, suction conduits connected to the rollers, and valve mechanism controlling the conduits to permit suction through either and cut it off from the other.

29. In apparatus of the character set forth, the combination with a support for sheets, of suction rollers rotating on angularly disposed axes, means for constantly rotating the rollers, a suction conduit having branches connected to the rollers, a valve movable to positions to open either branch to the main conduit and cut off the other and vice versa, and means for operating the valve.

30. In apparatus of the character set forth, the combination with a support for sheets, of suction rollers rotating on angularly disposed axes, means for constantly rotating the rollers, a suction conduit having branches connected to the rollers, a valve movable to positions to open either branch to the main conduit and cut off the other and vice versa, and manually controlled fluid operated mechanism for effecting the movements of the valve.

31. In apparatus of the character set forth, the combination with a support for sheets, of angularly disposed suction rollers for removing the sheets from the support, means for rotating certain of said rollers in either of opposite directions to move the sheets in opposite directions, and means for creating suction through either the reversible rollers or the others.

32. In apparatus of the character set forth, the combination with a support, of means for feeding sheets on to the support from one end, a gate at the other end for stopping the sheets on the support, rollers for delivering the sheets laterally from the support alongside the gate, and means for operating the gate to permit sheets to pass the same and away from the support.

33. In apparatus of the character set forth, the combination with a support, of means for feeding sheets on to the support from one end, a gate at the other end for stopping the sheets on the support, rollers for delivering the sheets laterally from the support alongside the gate, means for operating the gate to permit sheets to pass the same and away from the support, and means for directing the sheets that pass the gate to a position beneath the support.

34. In apparatus of the character set forth, the combination with a support, of means for feeding sheets on to the support from one end, a gate at the other end for stopping the sheets on the support, suction rollers for delivering the sheets laterally from the support alongside the gate, another suction roller for moving the sheets past the gate when the latter is moved to an inactive position, means for manually creating suction in the first rollers, and means for preventing such suction and creating suction in the latter roller when the gate is moved.

35. In apparatus of the character set forth, the combination with a support, of means for feeding sheets on to the support from one end, a gate at the other end for stopping the sheets on the support, suction rollers for delivering the sheets laterally from the support alongside the gate, another suction roller for moving the sheets past the gate when the latter is moved to an inactive position, means for manually creating suction on the first roller, and means for preventing such suction, creating suction in the latter roller and moving the gate to inactive position.

36. In apparatus of the character set forth, the combination with an inspection field, of feeding means for delivering sheets successively thereonto from one side of the field, a movable gate at the opposite side of the field for stopping the sheets thus fed, rotary suction rollers for moving the sheets laterally lengthwise of the gate, means for intermittently creating suction through the rollers, driving means for causing the rollers to be rotated in either of opposite directions to correspondingly deliver the sheets, a suction roller for continuing the movement of the sheets in the direction in which they were fed to the field, and means for creating suction in the last mentioned roller and moving the gate to permit the sheets to pass the same.

37. In apparatus of the character set forth, the combination with an inspection field, of feeding means for delivering sheets successively thereonto from one side of the field, a movable gate at the opposite side of the field for stopping the sheets thus fed, rotary suction rollers for moving the sheets laterally lengthwise of the gate, means for intermittently creating suction through the rollers, driving means for causing the rollers to be rotated in either of opposite directions to correspondingly deliver the sheets, said driving means normally rotating the rollers in one direction, means for causing the driving means to rotate the rollers in opposite directions, a suction roller for continuing the movement of the sheets in the direction in which they were fed to the field, and means for shifting the suction from the first named rollers to the last named roller and moving the gate to permit the sheets to pass the same.

38. In apparatus of the character set forth, the combination with an inspection field, of a gate at one side of the same, a lower set of suction rollers that operate longitudinally of the gate, an upper set of suction rollers that operate transversely of the gate, means for feeding sheets successively on to the field between the rollers and against the gate, driving means for normally rotating the lower rollers in a predetermined direction, mechanism for shifting the driving means to rotate rollers in an opposite direction, a suction conduit connected to the various rollers, an automatic valve opening and closing the conduit, a second controlling valve in the conduit normally effecting communication with the lower rollers and cutting of communication with the upper rollers, and mechanism for operating the second controlling valve and opening the gate to cause the upper rollers to move the sheets past said gate and maintain the lower rollers inactive.

39. In apparatus of the character set forth, the combination with an inspection field, of a gate at one side of the same, a lower set of suction rollers that operate longitudinally of the gate, an upper set of suction rollers that operate transversely of the gate, means for feeding sheets successively on to the field between the roller and against the gate, oppositely rotating driving members for rotating the lower rollers in either of opposite directions, a clutch for causing either driving member to become active, a suction conduit connected to the various rollers, an automatic valve opening and closing the conduit, a second controlling valve in the conduit normally effecting communication with the lower rollers and cutting off communication with the upper rollers, a suction motor including a cylinder, and a piston thereon, a connection between the piston and the second controlling valve and between the motor and the gate for effecting the shifting of the valve and the opening of the gate on the movement of the piston in one direction, a connection between the piston and the clutch to shift the latter when the piston is moved in an opposite direction, a suction conduit having branches leading to the motor cylinder on opposite sides of the piston, and valves in the branches controlling the opening and closing of the branches to the conduit.

40. In apparatus of the character set forth, the combination with an inspection field, of a suction head for delivering sheets on to the field to be inspected, a suction head for removing the sheets so delivered, and mechanism for causing suction to take place intermittently in both heads and in timed relation to effect the delivery of the sheet on to the field, and into coaction with the removing suction head when the latter has no suction therein and thereafter causing suction to take place in the latter suction head.

41. In apparatus of the character set forth, the combination with a suction roller, of means for rotating it in either of opposite directions, means for causing suction to take place intermittently in the roller, and mechanism for controlling the direction of rotation of the roller to cause it to rotate in either direction while suction is taking place therein.

42. In apparatus of the character set forth, the combination with a plurality of suction rollers, of means for feeding sheets into coaction with both rollers, and means for creating suction in either roller while cutting it off from the other to cause either roller to act upon and move the sheet.

43. In apparatus of the character set forth, the combination with a plurality of suction rollers, of means for feeding sheets between said rollers, and means for creating suction in either roller while cutting it off from the other to cause either roller to act upon and move the sheet.

44. In apparatus of the character set forth, the combination with a plurality of angularly disposed suction rollers, of means for feeding sheets into coaction with both rollers, and means for creating suction in either roller while cutting it off from the other to cause either roller to act upon and move the sheet.

45. In apparatus of the character set forth, the combination with a plurality of angular disposed suction rollers, of means for feeding sheets between said rollers, and means for creating suction in either roller while cutting it off from the other to cause either roller to act upon and move the sheet.

In testimony whereof, I affix my signature.
ALBERT BROADMEYER.